United States Patent
Chen et al.

(10) Patent No.: US 11,232,572 B2
(45) Date of Patent: Jan. 25, 2022

(54) PROGRESSIVELY-TRAINED SCALE-INVARIANT AND BOUNDARY-AWARE DEEP NEURAL NETWORK FOR THE AUTOMATIC 3D SEGMENTATION OF LUNG LESIONS

(71) Applicant: Merck Sharp & Dohme Corp., Rahway, NJ (US)

(72) Inventors: Antong Chen, Blue Bell, PA (US); Gregory Goldmacher, Landsdale, PA (US); Bo Zhou, New Haven, CT (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 93 days.

(21) Appl. No.: 16/848,192

(22) Filed: Apr. 14, 2020

(65) Prior Publication Data
US 2021/0056703 A1 Feb. 25, 2021

Related U.S. Application Data

(60) Provisional application No. 62/889,463, filed on Aug. 20, 2019.

(51) Int. Cl.
*G06T 7/11* (2017.01)
*G06N 3/08* (2006.01)
*G06T 7/00* (2017.01)

(52) U.S. Cl.
CPC .................. *G06T 7/11* (2017.01); *G06N 3/08* (2013.01); *G06T 7/0012* (2013.01);
(Continued)

(58) Field of Classification Search
CPC combination set(s) only.
See application file for complete search history.

(56) References Cited

U.S. PATENT DOCUMENTS 10,496,884 B1 * 12/2019 Nguyen ............... G06N 3/0454
10,499,857 B1 * 12/2019 Nguyen ................... G06N 3/08
(Continued)

FOREIGN PATENT DOCUMENTS

WO WO-2018229490 A1 * 12/2018 ............... G06N 3/08

OTHER PUBLICATIONS

Armato III, S. G. et al., "Automated Lung Segmentation for Thoracic CT: Impact on Computer-Aided Diagnosis," Academic Radiology, Sep. 2004, pp. 1011-1021, vol. 11. No. 9.
(Continued)

*Primary Examiner* — Tsung Yin Tsai
(74) *Attorney, Agent, or Firm* — Fenwick & West LLP (57) ABSTRACT

A system and method are disclosed for segmenting a set of two-dimensional CT slices corresponding to a lesion. In an embodiment, for each of at least a subset of the set of CT slices, the system inputs the CT slice into a plurality of branches of a trained segmentation block. Each branch of the segmentation block includes a convolutional neural network (CNN) with filters at a different scale, and produces one or more levels of output. The system generates, for each CT slice in the subset, feature maps for each level of output. The system generates a segmentation of each CT slice in the subset based on the feature maps of each level of output. The system aggregates the segmentations of each slice in the subset to generate a three-dimensional segmentation of the lesion. The system transmits data representing the three-dimensional segmentation to a user interface for display.

20 Claims, 7 Drawing Sheets

(52) U.S. Cl.
CPC .............. *G06T 2207/10081* (2013.01); *G06T 2207/20081* (2013.01); *G06T 2207/30061* (2013.01); *G06T 2207/30096* (2013.01)

(56) References Cited

U.S. PATENT DOCUMENTS

| | | | | |
|---|---|---|---|---|
| 10,853,449 | B1* | 12/2020 | Nguyen | G06N 3/084 |
| 2020/0058126 | A1* | 2/2020 | Wang | G06N 3/0481 |
| 2020/0085382 | A1* | 3/2020 | Taerum | G06T 7/30 |
| 2020/0380675 | A1* | 12/2020 | Golden | G06T 7/0012 |
| 2021/0073987 | A1* | 3/2021 | Tegzes | G06T 7/0012 |

OTHER PUBLICATIONS

Bai, W. et al., "Semi-Supervised Learning for Network-Based Cardiac MR Image Segmentation," Springer, In International Conference on Medical Image Computing and Computer-Assisted Intervention—MICCAI 2017, Sep. 10, 2017, pp. 253-260, vol. 10434.

Cai, J. et al., "Accurate Weakly-Supervised Deep Lesion Segmentation using Large-Scale Clinical Annotations: Slice-Propagated 3D Mask Generation from 2D RECIST," arXiv preprint arXiv: 1807.01172, Jul. 2, 2018, nine pages.

Cha, J. et al., "Segmentation and tracking of lung nodules via graph-cuts incorporating shape prior and motion from 4D CT," Medical Physics, Jan. 2018, pp. 297-306, vol. 45, No. 1.

Eisenhauer, E. A. et al., "New response evaluation criteria in solid tumours: Revised RECIST guideline (version 1.1)," European Journal of Cancer, 2009, pp. 228-247, vol. 45, No. 2.

Gu, Y. et al., "Automated delineation of lung tumors from CT images using a single click ensemble segmentation approach," Pattern Recognition, Mar. 2013, pp. 692-702, vol. 46, No. 3.

Hoogi, A. et al., "Adaptive local window for level set segmentation of CT and MRI liver Tesions," Medical Image Analysis, Apr. 2017, pp. 46-55, vol. 37.

Horsch, K. et al., "Automatic segmentation of breast lesions on ultrasound," Medical Physics, Aug. 2001, pp. 1652-1659, vol. 28, No. 8.

Kamnitsas, K. et al., "Efficient multi-scale 3D CNN with fully connected CRF for accurate brain lesion segmentation," Medical Image Analysis, 2017, pp. 61-78, vol. 36.

Kanazawa, A. et al., "Locally Scale-Invariant Convolutional Neural Networks," arXiv preprint arXiv: 1412.5104, Dec. 16, 2014, 11 pages.

Krähenbühl, P. et al., "Efficient Interference in Fully Connected CRFs with Gaussian Edge Potentials," In Advances in neural information processing systems, 2011, pp. 109-117.

Krizhevsky, A. et al., "ImageNet Classification with Deep Convolutional Neural Networks," In Advances in neural information processing systems, 2012, pp. 1097-1105.

Li, C. et al., "A Likelihood and Local Constraint Level Set Model for Liver Tumor Segmentation from CT volumes," IEEE Transactions on Biomedical Engineering, Oct. 2013, pp. 2967-2977, vol. 60, No. 10.

Nithila, E. E. et al., "Segmentation of lung nodule in CT data using active contour model and Fuzzy C-mean clustering," Alexandria Engineering Journal, 2016, pp. 2583-2588, vol. 55. No. 3.

Nogues, I. et al., "Automatic Lymph Node Cluster Segmentation Using Holistically-Nested Neural Networks and Structured Optimization in CT Images," Springer, In International Conference on Medical Image Computing and Computer-Assisted Intervention—MICCAI 2016, Oct. 17, 2016, pp. 388-397, vol. 9901.

Oquab, M. et al., "Is object localization for free?—Weakly-supervised learning with convolutional neural networks," 2015 IEEE Conference on Computer Vision and Pattern Recognition (CVPR), Jun. 7-12, 2015, pp. 685-694, Boston, MA, USA.

Ronneberger, O. et al., "U-Net: Convolutional Networks for Biomedical Image Segmentation," Springer, In International Conference on Medical Image Computing and Computer-Assisted Intervention—MICCAI 2015, Oct. 5-9, 2015, 10 pages, vol. 9351.

Rother, C. et al., ""GrabCut"—Interactive Foreground Extraction using Iterated Graph Cuts," ACM Transactions on Graphics, Aug. 2004, pp. 309-314, vol. 23.

Sedai, S. et al., "Semi-supervised Segmentation of Optic Cup in Retinal Fundus Images Using Variational Autoencoder," Springer, In International Conference on Medical Image Computing and Computer-Assisted Intervention—MICCAI 2017, Sep. 11-13, 2017, pp. 10 pages, vol. 10434.

Shen, H. et al., "Boundary-Aware Fully Convolutional Network for Brain Tumor Segmentation," Springer, In International Conference on Medical Image Computing and Computer Assisted Intervention—MICCAI 2017, Sep. 11-13, 2017, 11 pages, vol. 10434.

Simonyan, K. et al., "Very Deep Convolutional Networks for Large-Scale Image Recognition," arXiv preprint arXiv: 1409.1556, Sep. 2014, 14 pages.

Xie, S. et al., "Holistically-Nested Edge Detection," International Journal of Computer Vision, Dec. 2017, pp. 3-18, vol. 125, No. 1-3.

Xu, Y. et al., "Scale-Invariant Convolutional Neural Network," arXiv preprint arXiv: 1411.6369, Nov. 24, 2014, nine pages.

Yan, K. et al., "Deep Lesion Graphs in the Wild: Relationship Learning and Organization of Significant Radiology Image Findings in a Diverse Large-scale Lesion Database," IEEE/CVF Conference on Computer Vision and Pattern Recognition (CVPR), Jun. 2018, pp. 9261-9270.

Yuan, Y. et al., "A dual-stage method for lesion segmentation on digital mammograms," Medical Physics, Nov. 2007, pp. 4180-4193, vol. 34, No. 11.

Zhou, B. et al., "A Weakly Supervised Adaptive DenseNet for Classifying Thoracic Diseases and Identifying Abnormalities,", arXiv preprint arXiv: 1807.01257, Jul. 2018, 10 pages.

\* cited by examiner

PROGRESSIVELY-TRAINED SCALE-INVARIANT AND BOUNDARY-AWARE DEEP NEURAL NETWORK FOR THE AUTOMATIC 3D SEGMENTATION OF LUNG LESIONS

CROSS-REFERENCE TO RELATED APPLICATION

This application claims benefit of U.S. Provisional Patent Application Ser. No. 62/889,463 filed Aug. 20, 2019, which is incorporated by reference.

TECHNICAL FIELD

The disclosure generally relates to the field of image processing, and in particular to the automatic segmentation of Computed Tomography (CT) images.

BACKGROUND

In various medical fields, computed tomography (CT) and magnetic resonance (MR) images are used in clinical care and clinical trials to assess the effects of treatment on lesion size over time. Currently, lesion size is often characterized using a single diameter measurement. Current methods of obtaining a single diameter measurement often involve medical professionals manually delineating the boundary of a lesion on a single slice where the lesion looks largest. However, this method is a time-consuming, resource-intensive, and labor-intensive task, which prohibits this method from being applied to three-dimensional images. Further, because current automated three-dimensional segmentation methods are often highly sensitive to initial conditions and model parameters, they are unable to adapt to lesions of varying sizes and shapes.

SUMMARY

Embodiments relate to a model for the automatic segmentation of computed tomography (CT) images. The model is progressively trained such that it can more accurately and consistently generate three-dimensional segmentations of lesions of varying sizes and shapes than is possible using conventional approaches.

In various embodiments, a computer-implemented method of segmenting a set of two-dimensional CT slices corresponding to a lesion includes, for each of at least a subset of the set of CT slices, inputting the CT slice into a plurality of branches of a trained segmentation block. Each branch of the segmentation block includes a convolutional neural network (CNN) with convolutional filters at a different scale, and each branch produces one or more levels of output. In one embodiment, the segmentation block includes three branches, and each branch has three levels of output. The first branch may be a primary branch and each additional branch may adopt convolutional filters based on the filters of the primary branch. The method also includes, for each of the CT slices in the subset, generating feature maps for each of the levels of output. The feature maps are generated by combining same-level outputs across each of the branches. The same-level outputs may be combined using element-wise max-pooling.

The method further includes, for each of the CT slices in the subset, generating a segmentation of the CT slice based on the feature maps. The method further includes aggregating the segmentations of each slice in the subset of CT slices to generate a three-dimensional segmentation of the lesion. The method also includes transmitting data representing the three-dimensional segmentation of the lesion to a user interface for display of the three-dimensional segmentation.

The method may further include training the segmentation block by accessing a set of two-dimensional CT slices of lesions, the set including a first segment of CT slices and a plurality of sequential segments of CT slices. Each CT slice in the first segment represents a first layer of a lesion and includes a single diameter measurement. Each slice in a sequential segment represents a sequential layer of a corresponding lesion. The method of training the segmentation block further includes initializing weights of the segmentation block with initial values and applying the segmentation block to the first segment of CT slices to generate a prediction of segmentation for each CT slice in the first segment. The method of training the segmentation block further includes updating the weights of the segmentation block based on the prediction and the single diameter measurement of each CT slice in the first segment. The method of training the segmentation block further includes sequentially updating the weights of the segmentation block based on each additional segment of the plurality of sequential segments. The weights are sequentially updated by applying the segmentation block to the additional segment to generate a prediction of a segmentation for each CT slice in the additional segment, refining the prediction of the segmentations to produce a refined segmentation of each CT slice in the additional segment, updating the weights of the segmentation block based on the refined segmentations and the CT slices in the additional segment, and adding the CT slices in the additional segment to a sequential segment. The method of training the segmentation block may further include refining the prediction of the segmentations by applying the predictions and each CT slice in the additional segment to a fully-connected conditional random field.

Each two-dimensional CT slice may include an object of interest, such that, during training, a top level of the one or more levels of output is supervised by a segmentation mask of the object and a bottom level of the one or more levels of output is supervised by a boundary mask of the object. For example, same level outputs across each of the branches are pooled and convolved to generate a top level of output, which may be a probability map. The top level of output is supervised with the segmentation mask of the object. Similarly, the same level outputs across each of the branches may be pooled and convolved to generate a bottom level of output. The bottom level of output is supervised by the boundary mask of the object.

In other embodiments, the segmentation system is stored on a non-transitory machine-readable storage medium. The system is manufactured by a process including, for each of at least a subset of a set of CT slices of a lesion, inputting the slice into a plurality of branches of a trained segmentation block, each branch including a CNN with convolution filters at a different scale, and each branch produces one or more levels of output. The process further includes generating features maps for each of the levels of output based on a concatenation of same-level outputs across each of the branches, and generating a segmentation of the CT slice based on the feature maps of each of the levels of output. The process further includes aggregating the segmentations of each slice in the subset to generate a three-dimensional segmentation of the lesion, and transmitting data representing the three-dimensional segmentation of the lesion to a user interface for display of the three-dimensional segmentation.

In further embodiments, the image segmentation system includes a hardware processor and a non-transitory computer-readable medium that contains instructions that cause the hardware processor to, for at least a subset of a set of CT slices of a lesion, input the slice input a plurality of branches of trained segmentation block, where each branch includes a CNN with convolutional filters at a different scale and produces one or more levels of output; generate feature maps for each level of output based on a concatenation of same-level outputs across each of the branches; and generate a segmentation of the slice based on the feature maps. The instruction further causes the hardware processor to aggregate segmentations of each slice in the subset of CT slices to generate a three-dimensional segmentation of the lesion, and transmit data representing the three-dimensional segmentation of the lesion to a user interface for display of the three-dimensional segmentation.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates a diagram of a system environment of an image segmentation system, according to one embodiment.

DETAILED DESCRIPTION

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview of Method

Figure 1:
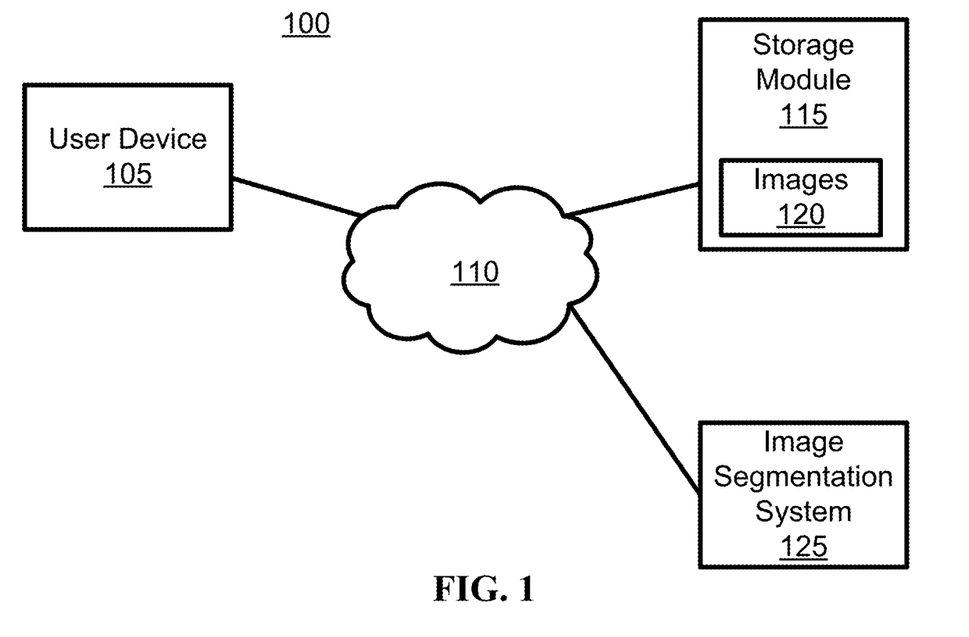

FIG. 1 illustrates one embodiment of a system environment 100 suitable for providing image segmentation. In the embodiment shown, the environment 100 includes a user device 105, a network 110, a storage module 115, and an image segmentation system 125. In other embodiments, the system environment 100 includes different and/or additional elements. In addition, the functions may be distributed among the elements in a different manner than described.

The user device 105 is one or more computing devices capable of receiving user input as well as transmitting and/or receiving data via a network 110. In one embodiment, a user device 105 is a computer system, such as a desktop or a laptop computer. Alternatively, a user device 105 may be a device having computer functionality, such as a personal digital assistant (PDA), a mobile telephone, a smartphone, or another suitable device. A user device 105 is configured to communicate via the network 110. The user device 105 may execute an application allowing a user of the user device 105 to interact with the image segmentation system 125 via a user interface. For example, a web browser application may enable interaction between the user device 105 and the image segmentation system 125 via the network 110 or a graphical user interface may be provided as part of a software application published by the image segmentation system 125 and installed on the user device 105. Alternatively, a user device 105 interacts with the image segmentation system 125 through an application programming interface (API) running on a native operating system of the user device 105, such as IOS® or ANDROID™.

The storage module 115 is one or more machine-readable media that store images 120. The storage module 115 may receive and store images 120 from a user device 105, the image segmentation system 125, third-party databases, and the like. In some embodiments, images are computed tomography (CT) images taken of one or more subjects. Subjects may include lesions, such as lung lesions, liver lesions, mediastinal lesions, subcutaneous lesions, and abdominal lesions. Subjects may also include enlarged lymph nodes and the like. Images taken consecutively may have spatial dependence. For example, consecutive images may correspond to a set of CT images of a single subject (e.g., CT slices captured along an axis of a lesion). Images may correspond to "center slices" and/or "edge slices." Center slices are CT images that have been taken where the lesion looks largest along a longitudinal axis of the lesion. Edge slices are additional CT images of lesions taken at additional locations along the longitudinal axis of the lesions. The storage module 115 may store images used for training, validation, and testing of the image segmentation system 125. A portion of these images may include manual delineations, such as center slices that have been manually delineated to include a single diameter measurement. An additional portion of these images may not include manual delineations, such as edge slices, that are segmented and refined during training. In one embodiment, a module with similar or identical functionality to the storage module 115 is integrated into the image segmentation system 125.

The image segmentation system 125 segments CT images to generate three-dimensional segmentations from two-dimensional slices. In some embodiments, the image segmentation system 125 uses a progressively trained scale-invariant and boundary-aware deep convolutional network to automatically segment three-dimensional volumes of subjects, such as lesions. Through progressive training, the image segmentation system 125 can effectively cope with scale-, size-, and shape-variability across lesions. In some embodiments, the deep convolutional network is progressively trained by 1) iteratively generating two-dimensional segmentations from center slices to edge slices and 2) updating network weights after each iteration based on the generated segmentations. Various embodiments of the image segmentation system 125 are described in greater detail below, with reference to FIGS. 2 through 4.

The user device 105, storage module 115, and image segmentation system 125 are configured to communicate via a network 110, which may include any combination of local area and/or wide area networks, using both wired and/or wireless communication systems. In one embodiment, a network 110 uses standard communications technologies and/or protocols. For example, a network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 110 may be represented using any suitable format, such as hypertext markup language (HTML) or extensible markup language (XML). In some embodiments, all or some of the communication links of a network 110 may be encrypted using any suitable technique or techniques.

Figure 2:
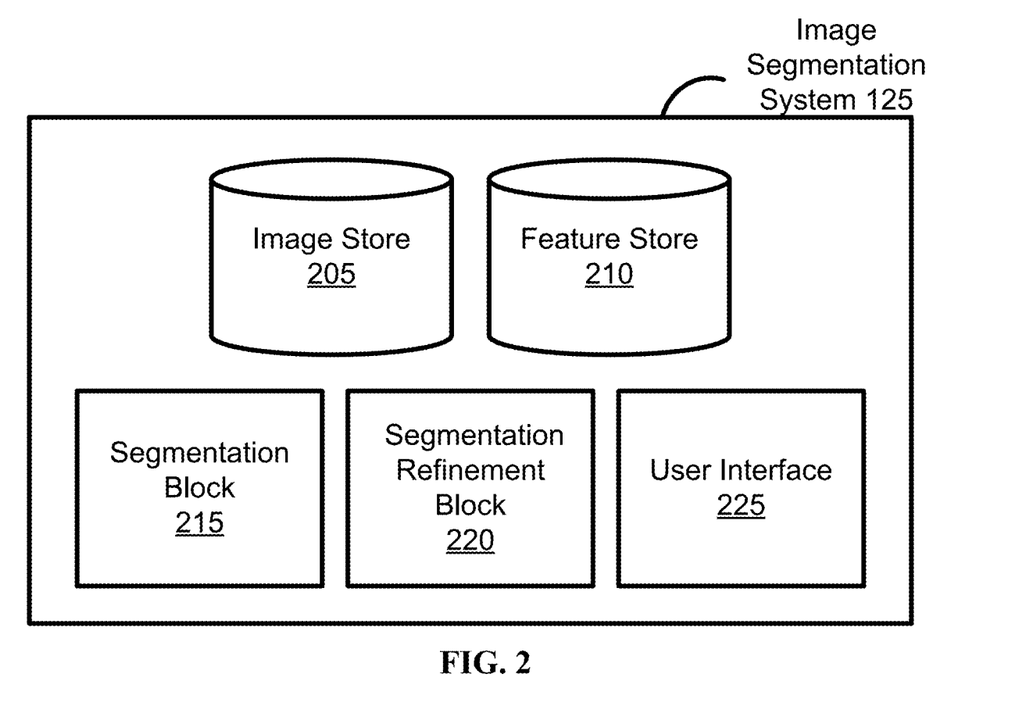
FIG. 2 is a block diagram of an architecture of the image segmentation system, according to one embodiment.

FIG. 2 shows one embodiment of the image segmentation system 125 of FIG. 1. In the embodiment shown, the image segmentation system 125 includes an image store 205, a feature store 210, a segmentation block 215, a segmentation refinement block 220, and a user interface 225. In other embodiments, the image segmentation system 125 includes different and/or additional elements. In addition, the functions may be distributed among the elements in a different manner than described.

The image segmentation system 125 maintains images and image data in the image store 205. Images maintained by the image store 205 may include local copies of some or all of the images 120 stored in the storage module 115. In one embodiment, the image store 205 stores the original, preprocessed, and segmented images. The image store 205 may also store images for training, validation, and testing of the image segmentation system 125. Original images include one or more CT slices of lesions that have been captured along an axis of the lesion. The number of slices captured and stored for a single lesion and slice thickness may vary. For example, the image store 205 may include CT slices with a thickness of 1 mm or less, 5 mm or less, 10 mm or less, 15 mm or less, and the like. In some embodiments, images may be preprocessed before segmentation. Preprocessing may include cropping a region of interest on the image to a bounding box. The edges of the bounding box may correspond to a dimension of the subject. For example, each edge of the bounding box may be a multiple of the lesion's longest diameter (e.g., one, two, three, five times the longest diameter). Preprocessing may also include modifying the intensity of each image. For example, the intensity may be converted into Hounsfield units using various linear transformation parameters (e.g., linear transform parameters recorded in the DICOM header). The dynamic range of the intensity may then be shifted and/or cut-off at zero such that all intensity values are non-negative. Further, the intensity may be normalized such that the intensity values ranges from zero to unity. In this way, the relative intensity changes between voxels are preserved.

Training images may include CT images of lesions in which a single diameter measurement is used to represent each lesion. For example, training images may include images that have been assessed according to Response Evaluation Criteria in Solid Tumors (RECIST). These images may correspond to center slices of lesions that have been scanned longitudinally and have been manually delineated. Training images may also include additional CT images of lesions taken at additional locations along the longitudinal axis of the lesions ("edge slices"). Edge slices used for training may not include manual delineations. Instead, unlabeled edge slices are used to improve model performance and are refined during training using one or more refinement techniques, such as conditional random fields. A subset of the training images may be used for validation. These images include center slices and edge slices that have been manually delineated in a slice-by-slice manner to form a dataset of three-dimensional delineations for validation. Training images may be stored in groups with various configurations. For example, images may be grouped by subject, region of interest, relative position along an axis of a subject (e.g., CT images of transaxial planes along a longitudinal axis), and the like. In some embodiments, users may manually delineate training images using a user interface. This may be a part of the user interface of the image segmentation system 125, or it may be a separate process performed on a system other than the image segmentation system 125.

The image store 205 may also store metadata for the images. Metadata may include date and time of image capture, preprocessing, or segmentation; author; device identification; imager settings; subject identification label; and the like. Metadata may also include measurement data, such as two-dimensional segmentation dimensions, three-dimensional segmentation dimensions, location of slice along subject axis, subject type (e.g., lesion and/or tumor type), and the like.

The image segmentation system 125 maintains the results of image segmentations in the feature store 210. Results may include two-dimensional segmentations of individual CT slices and aggregated three-dimensional segmentations of lesions from sets of CT slices. Results of segmentations may be in the form of probability maps and/or feature maps. Results may also include the location of image subjects (e.g., location coordinates of a lesion within a slice), lesion features, such as dimensions, volume, size progression, and the like. Results may also include evaluation metrics, such as the Dice similarity coefficient (DSC), volumetric similarity (VS), Hausdorff Distance (HD), etc., that are used to assess segmentation performance of the segmentation block 215 and/or segmentation refinement block 220. Results may be displayed to users on a user interface 225 of the image segmentation system 125.

The feature store 210 may also include parameters and features of the models generated by the segmentation block 215 and/or segmentation refinement block 220. Examples may include optimizer type, learning rate, batch size, preprocessing techniques, kernel size, filter scales, number of scales, number of branches, block architecture, loss functions, and the like. Further, model parameters and features may include model parameters and features of baseline models used by the image segmentation system 125 to evaluate the performance of the segmentation block 215 and/or segmentation refinement block 220. Baseline models may include mainstream convolution neural networks (CNN), such as classical CNNs used for biomedical image segmentation, alternative networks, such as holistically-nested networks (HNN) for edge detection and multi-scale/multi-level learning, and/or weakly supervised self-paced segmentation (WSSS) methods. In some embodiments, models maintained by the feature store 210 are subject-specific. For example, the feature store 210 may maintain separate tissue-specific models for segmenting lung, soft tissue, and liver lesions.

The segmentation block 215 is a progressively-trained scale-invariant and boundary-aware convolutional neural network for performing volumetric lesion segmentations from two-dimensional CT slices. In some embodiments, the segmentation block 215 includes two or more branches of CNN (e.g., two, three, four, five, or ten branches, etc.). Each branch of the segmentation block 215 includes filters at a different scale. Output from each of the branches are combined to generate scale-invariant responses. Filter weights may be regularized and tied to a primary branch such that the number of trainable parameters remain the same as the architecture of a CNN with a single branch. For example, a primary branch may adopt 3×3 filters in some or all of the convolutional layers, and the additional branches may adopt convolutional filters scaled up from the filters on the primary branch, such as 5×5 filters and 7×7 filters.

In some embodiments, each branch of the segmentation block produces outputs at multiple levels. In these embodiments, each branch of the segmentation block 215 includes two or more blocks that each produce a different level of output. Outputs from the different branches at the same level are combined (e.g., using element-wise max-pooling). An example architecture of a single branch of the segmentation block 215 is discussed in detail below with reference to FIG. 4.

The segmentation refinement block 220 refines segmentations generated by the segmentation block 215 during training of the segmentation block 215. Refined segmentations may include refined two-dimensional segmentations that are used by the image segmentation system 125 to progressively train the segmentation block 215. In these embodiments, two-dimensional segmentations are refined after each training iteration. Refined segmentations and their corresponding images are then added to the training dataset to update the segmentation block 215 in the next training iteration. Refined two-dimensional segmentations may be generated by applying a current segmentation prediction and corresponding image as input into a fully-connected conditional random field. This results in refined segmentations with tight boundaries.

Refined segmentations may also include refined three-dimensional segmentations that have been processed to eliminate potential irregularities between slices in the axial direction of a lesion. Various criteria may be used to determine if a two-dimensional segmentation is valid, and may be based on the segmentation mask, mask's centroid, area ratio, and the like. For example, two-dimensional slices may be considered valid if the segmentation mask or the mask's centroid lies inside the previous slices segmentation mask; the area ratio between the new and previous two-dimensional segmentations are within a predetermined range (e.g., within a range of [0.7, 1.3]), and the like. In some embodiments, when a two-dimensional slice is not considered valid, the previous two-dimensional segmentation may be copied onto the new image slice as an initialization for the refinement to obtain a new segmentation.

Users may provide images to the image segmentation system 125 via the user interface 225. For example, the user may be prompted by an element of a user interface to upload images to the image segmentation system 125. The user interface 225 may provide additional elements to the user to add grouping information to images. For example, the user interface 225 may include elements that allow the user to indicate which group an image is a member of, the number of slices in a group, location of slice relative to an axis of the subject, subject information (e.g., material captured and subject identification number), and the like. Users may also manually delineate images using interactive elements of the user interface 225 to produce additional training/validation data. The user interface 225 may also include additional elements that allow the user to select model parameters and/or training schema.

Figure 3:
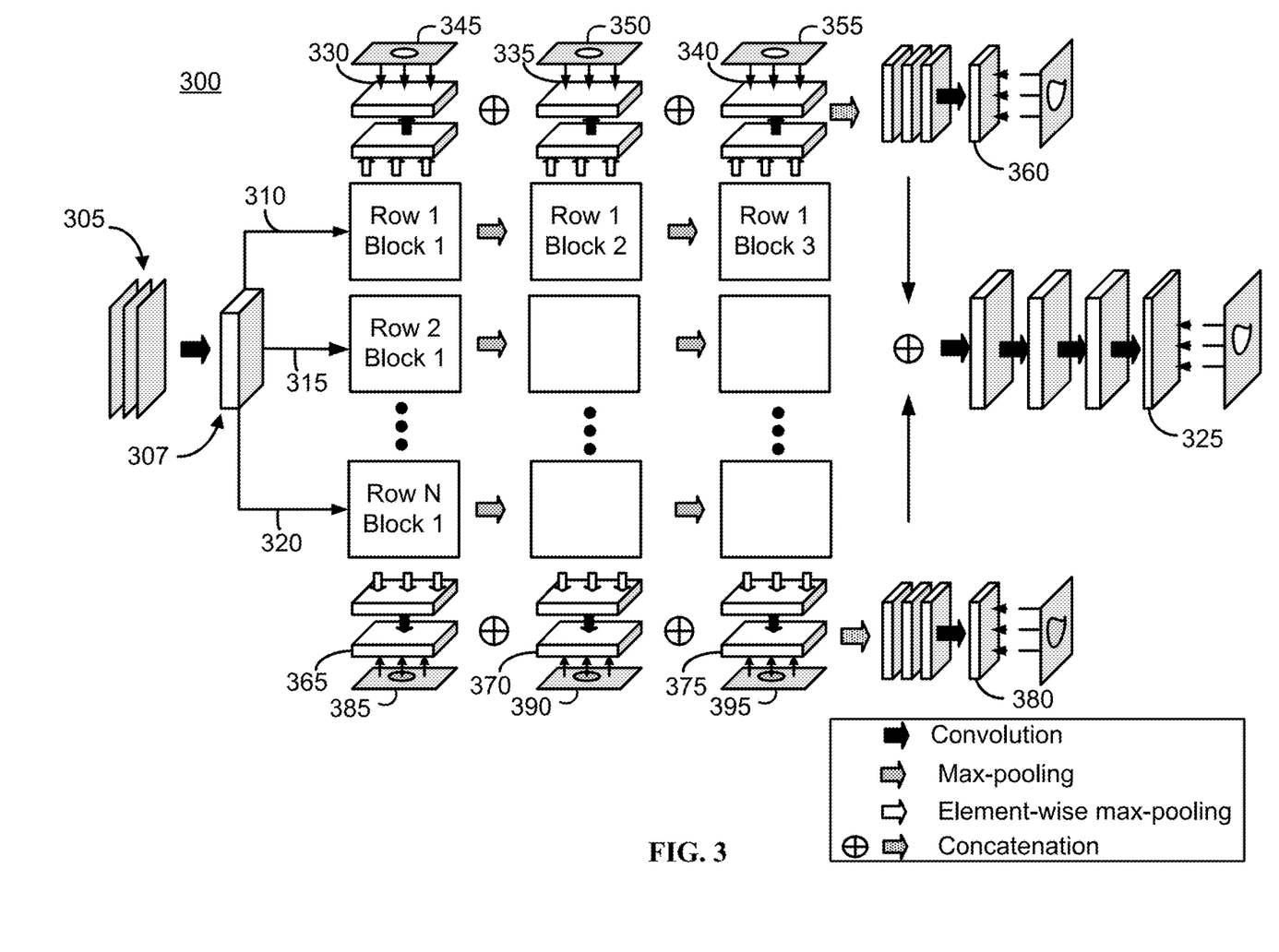
FIG. 3 is a block diagram illustrating an architecture of a segmentation block of the image segmentation system, according to one embodiment.

FIG. 3 is a block diagram illustrating an architecture of a segmentation block 215 of the image segmentation system 125, according to one embodiment. The segmentation block 215 is a progressively-trained scale-invariant and boundary-aware convolutional neural network for performing volumetric lesion segmentations from a set of two-dimensional CT slices 305 of a lesion. To produce a three-dimensional segmentation of the lesion from the set of two-dimensional CT slices 305, each CT slice is processed through the segmentation block 215 to produce a two-dimensional segmentation that captures the patterns of the lesion in the slice. The segmentations of each slice in the set 305 are aggregated to produce a volumetric prediction of the lesion. Data representing the volumetric prediction may be transmitted for display on a user interface of the image segmentation system 125. Further, features of the volumetric prediction and/or two-dimensional segmentations may be extracted. Features may be used to classify the lesion, analyze lesion progression, assess treatment efficacy, and the like.

The segmentation block 215 may include multiple branches of CNN. In FIG. 3, the segmentation block 215 includes three branches of CNN, and each branch of CNN is represented by a row. Other embodiments may include a segmentation block 215 with greater or fewer branches of CNN, branches with different architectures, and the like. A first branch 310 of the segmentation block 215 may be a primary branch, and a second branch 315 and third branch 320 of the segmentation block 215 may be secondary branches. Each branch of the segmentation block 215 includes convolutional layers that have adopted filters at different scales such that the segmentation block 215 can robustly respond to patterns of lesions at various scales. In some embodiments, the secondary branches adopt filters scales based on the filters of the primary branch. For example, if the convolutional layers in the first branch 310 adopt 3×3 filters, the convolutional layers in the second branch 315 may adopt 5×5 filters, and the convolutional layers in the third branch 320 may adopt 7×7 filters.

Each branch of the segmentation block 215 includes multiple blocks that each produce a different level of output. In the embodiment shown in FIG. 3, each branch includes three blocks, and each block produces output at a different level. An example architecture of each branch is discussed in detail below with reference to FIG. 4. Same-level outputs from each of the branches are combined to generate scale-invariant responses. In some embodiments, the same-level outputs from the branches are combined using element-wise max-pooling, as shown in FIG. 3. The outputs across the branches are combined to produce a final prediction 325 for each CT slice. In this way, the patterns of a single slice are captured by one or more branches of the segmentation block 215, which brings robustness to the segmentation of lesion images at different scales. The final prediction 325 of each slice may take the form of a probability map. The final predictions for each slice in set of CT slices of a lesion are aggregated (e.g., stacked) to produce a volumetric prediction of the lesion. In some embodiments, to produce a volumetric prediction of the lesion, the predicted lesion masks of each slice in the set of CT slices of the lesion are placed adjacent to each other in three-dimensional space.

In some embodiments, volumetric predictions produced during training are further processed to eliminate potential irregularities between slices in the axial direction as a product of the slice-by-slice prediction mechanism. Post-processing may include analyzing the validity of each new two-dimensional segmentation along the axial direction of the lesion. Criteria may be based on the segmentation mask, the centroid of the mask, and the area ratio between successive slices. For example, a slice may be considered valid if 1) the segmentation mask or the mask's centroid lies inside the previous slice's segmentation mask and/or 2) the area ratio between the new and previous two-dimensional segmentations is within a predetermined range (e.g., [0.5, 1.5]). In some embodiments, when a two-dimensional segmentation is found to be invalid, the previous two-dimensional segmentation may be applied to the new image slice as an initialization for the CRF-based refinement to obtain the new segmentation on the new image slice.

In some embodiments, the segmentation block 215 is jointly optimized and deeply supervised by the lesions' segmentation masks and boundaries derived from the masks. In these embodiments, the joint loss function is defined by Equation 1.

$$\mathcal{L} = \omega_m \sum_{n \in l_1 l_2 l_3 l_{com}} \left(1 - \frac{2|M_n \cap \hat{M}_n|}{|M_n| + |\hat{M}_n|}\right) + \omega_b \sum_{n \in l_1 l_2 l_3 l_{com}} \left(1 - \frac{2|B_n \cap \hat{B}_n|}{|B_n| + |\hat{B}_n|}\right) + \omega_f \sum_{n \in l_1 l_2 l_3 l_{com}} \left(1 - \frac{2|L \cap \hat{L}|}{|L| + |\hat{L}|}\right) \quad (1)$$

In Equation 1, $\hat{M}_n$ is a regional prediction, $M_n$ is a regional ground-truth, $\hat{B}_n$ is a boundary prediction, $B_n$ is a boundary ground-truth. $\hat{L}$ is a final prediction. L is a final ground truth. The regional prediction is the predicted region of the image that includes the lesion. The regional ground truth is the actual region of the image that includes the lesion, as determined by a sufficiently reliable method, such as manual labeling. The boundary prediction is the predicted boundary of the lesion in the image. The boundary ground truth is the actual boundary of the lesion in the image, as determined by a sufficiently reliable method, such as manual labeling. $\omega_m$, $\omega_b$, and $\omega_f$ are weights determining a respective contribution of a respective type of loss in the joint loss function. In particular, $\omega_m$ is the weight representing the contribution of the mask loss in the joint loss function, $\omega_b$ is the weight representing the contribution of the boundary mask in the joint loss function, and $\omega_f$ is the weight representing the contribution of the final segmentation prediction in the joint loss function. $l_1$ is a first level of output. $l_2$ is a second level of output. $l_3$ is a third level of output. $l_{com}$ is a combination of the first level of output, the second level of output, and the third level of output from the deep supervisions.

The regional prediction, $\hat{M}_n$, is generated from the outputs at the top (e.g., output 330, output 335, and output 340), which are probability maps that have been deeply supervised by the segmentation masks of the lesion (e.g., mask 345), and their combination 360. In some embodiments, output 330 is generated from the first level of output, $l_1$, of one or more of the branches of the segmentation block 215, and is deeply supervised by the segmentation mask 345 of the lesion. Similarly, output 335 is generated from the second level of output, $l_2$, of one or more of the branches of the segmentation block 215 and is supervised by the segmentation mask 350 of the lesion. Further, output 340 is generated from the third level of output, $l_3$, of one or more of the branches of the segmentation block 215 and is supervised by the segmentation mask 355 of the lesion.

The boundary prediction, $\hat{B}_n$, is generated from the outputs at the bottom (e.g., output 365, output 370, and output 375), which are probability maps that have been deeply supervised by the boundaries derived from the segmentation masks of the lesions, and their combination 380. For example, output 365 is generated from the first level of output, $l_1$, of one or more of the branches of the segmentation block 215, and is supervised by the boundary 385 of the lesion. Similarly, output 370 is generated from the second level of output, $l_2$, of one or more of the branches of the segmentation block 215, and is supervised by the boundary 390 of the lesion, and output 375 is generated from the third level of output, $l_3$, of one or more of the branches of the segmentation block 215, and is supervised by the boundary 395 of the lesion.

Figure 4:
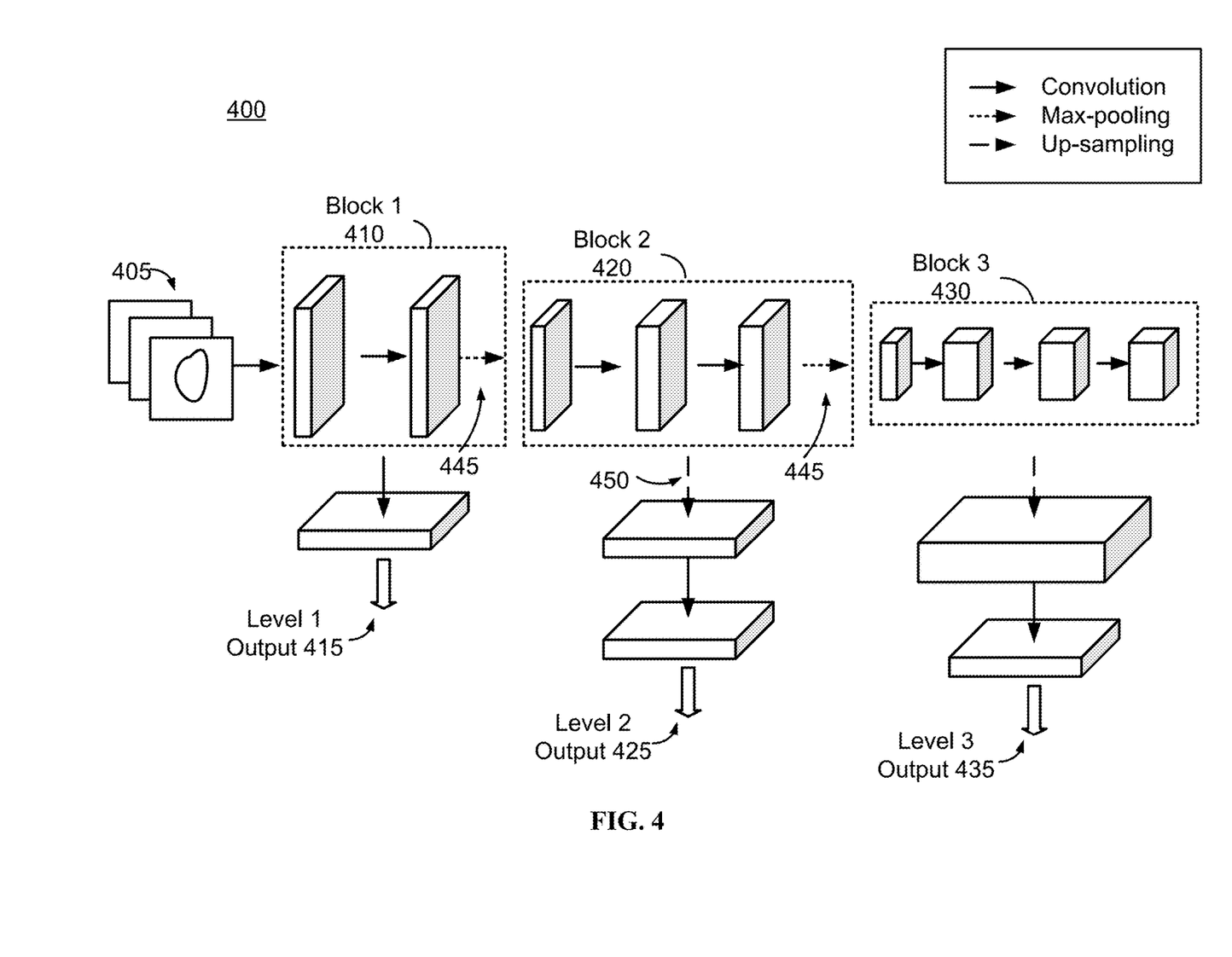
FIG. 4 is a block diagram illustrating an architecture of a branch of the segmentation block, according to one embodiment.

FIG. 4 is a block diagram illustrating an architecture of a branch of the segmentation block 215, according to one embodiment. The branch 400 includes three blocks that each produce output at a different level. In some embodiments, each branch may include a greater or smaller number of blocks and produce output accordingly. Block 1 410 produces level 1 output 415, block 2 420 produces level 2 output, and block 3 430 produces level 3 output 435. To produce the level 1 output 415, level 2 output 425, and level 3 output, the output from the corresponding blocks are up-sampled and/or convolved so that element-wise max-pooling may be performed in subsequent steps of the segmentation block 215. Further, block outputs may be further pooled before being passed to a subsequent block. For example, the output from block 1 410 is max-pooled before being passed to block 2 420. Similarly, the output from block 2 is max-pooled 445 before being passed to block 3 430. In some embodiments, each block includes VGG16 architecture. Other embodiments of segmentation block 215 branches may include architectures different and/or additional layers than those shown in FIG. 4. For example, any suitable stackable CNN that introduces resolution change to generate feature maps through pooling mechanisms and/or changing convolution stride size may be used.

Figure 5:
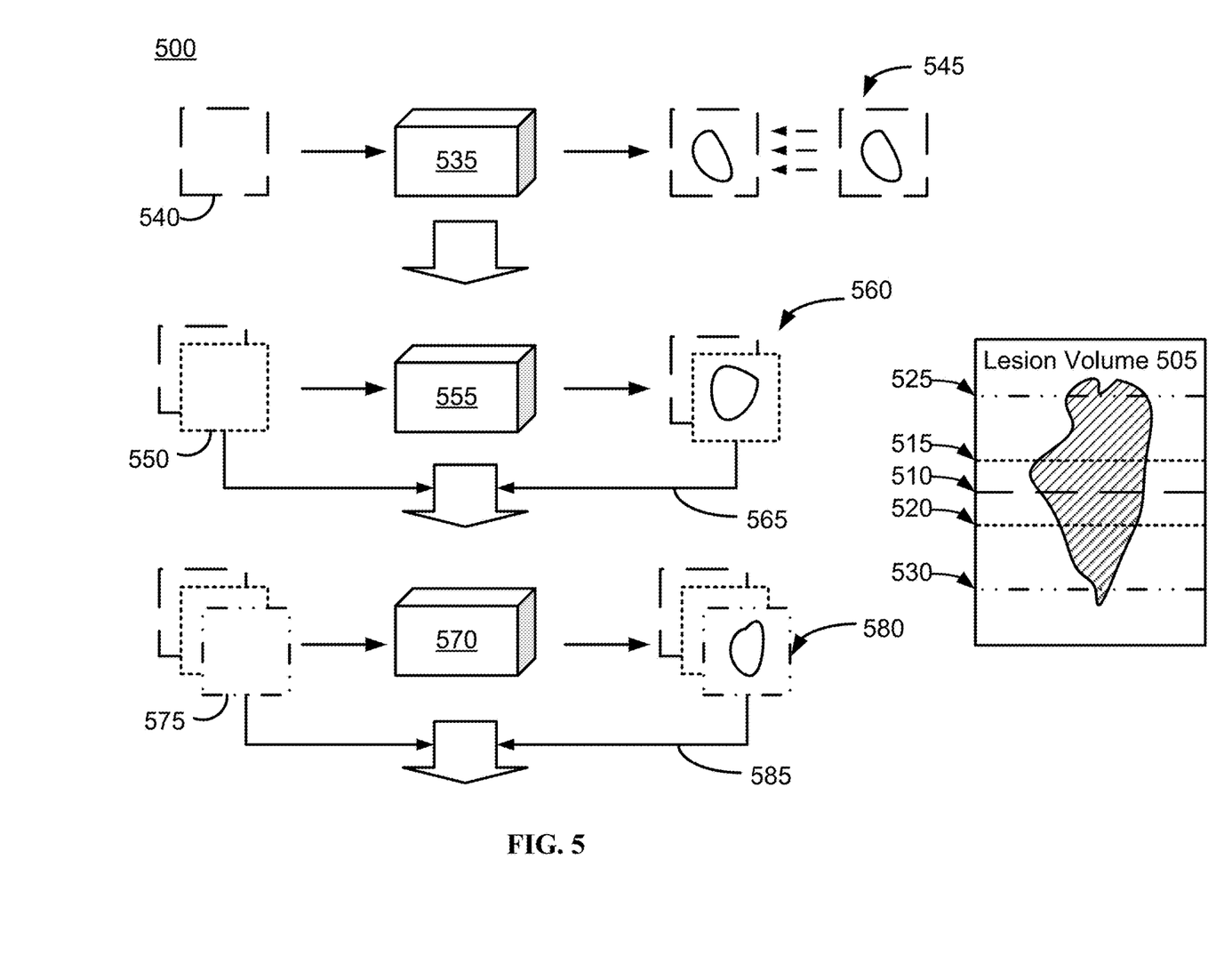
FIG. 5 is a diagram illustrating a method of training an image segmentation block, according to one embodiment.

FIG. 5 is a diagram illustrating a method 500 of training a segmentation block 215, according to one embodiment. The segmentation block 215 is progressively trained using a self-paced algorithm. During training, training images are progressively added to the training dataset such that the segmentation block 215 can cope with scale-variability as the segmentation block 215 progresses from center slices to edge slices and/or is applied to segment lesions with a large range of size variability.

Training images include CT images of lesions. Each lesion is associated with a center slice, which is the slice corresponding to where the lesion looks largest along an axis of the lesion. Each lesion is also associated with one or more edge slices, representing sequential slices taken along the axis of the lesion. For example, the object volume 505 is associated with five slices: a center slice 510, and four edge slices taken along an axis of the lesion in superior and inferior directions, namely slice 515, slice 520, slice 525, and slice 530. The number and thickness of lesion slices may vary based on a set of predetermined preferences chosen by the image segmentation system 125 and/or a user of the image segmentation system 125. Further, the number of slices of each lesion used during training may be based on a set of predetermined rules and/or preferences selected by the image segmentation system 125 and/or user of the image segmentation system 125. For example, lesions may be assumed to have a spheroidal or ellipsoidal shape in three-dimensions. Under this assumption, the range for evaluating successive CT slices on the axial direction may be approximated based on the diameter of the center slice, d. For example, the axial range may be defined for the evaluation to be [−0.8 d, 0.8d] from the center slice on the axial direction. In this example, CT slices falling within this range are included and evaluated in the volumetric lesion segmentation task.

A portion of training images may include slices that have been manually delineated, such as center slices that have been delineated in a pixel-wise manner. Center slices are associated with a single diameter measurement that represents the largest diameter of the lesion along an axial direction of the lesion. A portion of training images may also include slices that have not been manually delineated, such as edge slices. Model performance is improved by progressively training the segmentation block on unlabeled images. Images that have not manually delineated are refined during training using one or more refinement techniques, such as conditional random fields. Further, training images used for validation may include a set of center and edge slices that have been manually delineated to form a dataset of three-dimensional delineations.

In the method 500 shown, the training dataset initially contains training images of center slices. As the segmentation block 215 is progressively trained, additional training images are added to the training dataset. In some embodiments, neighboring edge slices are adding during each iteration of training. For example, in a first iteration, the segmentation block 215 may be trained with center slices only, such as the center slice 510 of the lesion volume 505. In a second iteration, the segmentation block 215 may be trained with center slices and neighboring slices, such as slice 515 and slice 520. In a third iteration, additional neighboring slices such as slice 525 and slice 530, are added to the training dataset. The training dataset may be continuously augmented with successive slices until the training dataset includes a threshold number the training images.

As shown in FIG. 5, the segmentation block 535 is initially trained with a set of center slices 540. Training of the segmentation block 535 is supervised using the two-dimensional delineations of the center slices 545. After the segmentation block 535 converges, the converged segmentation block 555 is applied to a set of successive slices, such as edge slices 550, to predict two-dimensional segmentations 560 of the set of successive slices. The segmentations 560 are refined with a tight boundary by applying a conditional random field to the segmentations 560 and the edge slices 550. The refined segmentations and the corresponding images are added 565 to the training dataset to update the segmentation block 555 in the next iteration. For example, the refined predictions and corresponding images are added to the training dataset, which is then used to train the segmentation block 555 until it converges, producing an updated segmentation block 570. The updated segmentation block 570 is then applied to an additional set of successive slices, e.g., slices 575, to predict two-dimensional segmentations 580 of the additional set of successive slices. The predictions are refined with a tight boundary, and the refined predictions and corresponding images are added 585 to the training dataset. The training dataset is then used to update the segmentation block 570. This process may be repeated until a threshold portion of the training images have been added to the training dataset and the segmentation block converges. To test the converged segmentation block, the converged segmentation block is applied to a testing dataset to produce segmentations for the CT slices in the testing dataset.

Figure 6:
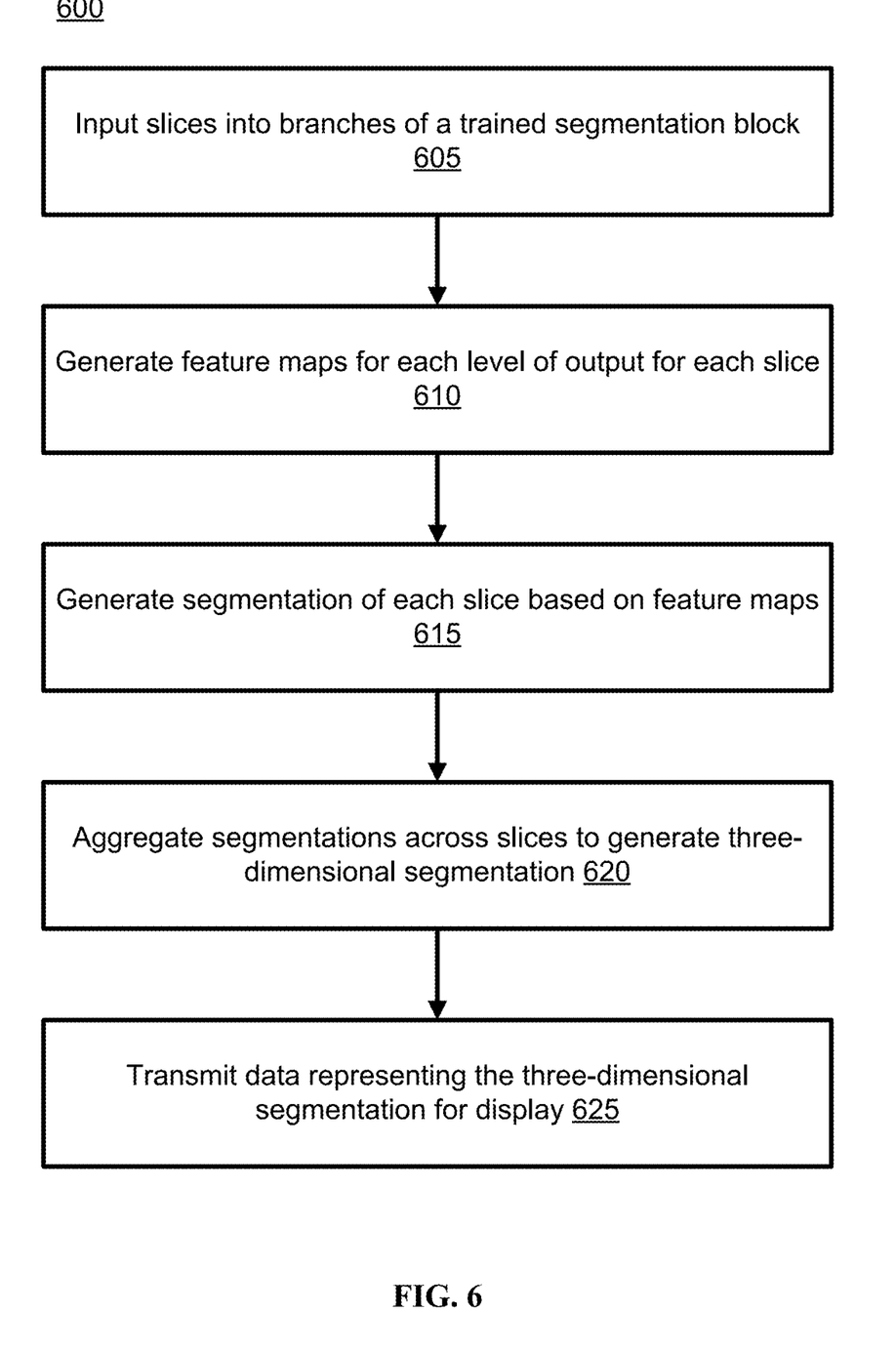
FIG. 6 is a flowchart of a method for segmenting images, according to one embodiment.

FIG. 6 is a flowchart of a method 600 for segmenting images, according to one embodiment. In the method 600 shown, a set of two dimensional CT slices corresponding to a lesion are segmented to generate a three-dimensional segmentation of the lesion. To generate the three-dimensional segmentation of the lesion, each slice for at least a subset of the set of CT slices is input 605 into a plurality of branches of a trained segmentation block 215. Each branch includes a CNN with convolution filters at a different scale, and each branch produces one or more levels of output. Feature maps are generated 610 for each of the levels of output based on a combination of same-level outputs across each of the branches. A two-dimensional segmentation of the slice is generated 615 based on the feature maps of each of the levels of output. The two-dimensional segmentations of each slice in the subset of CT slices are aggregated 620 to generate a three-dimensional segmentation of the lesion. Data representing the three-dimensional segmentation of the lesion is transmitted 625 to a user interface for display of the three-dimensional segmentation.

Figure 7:
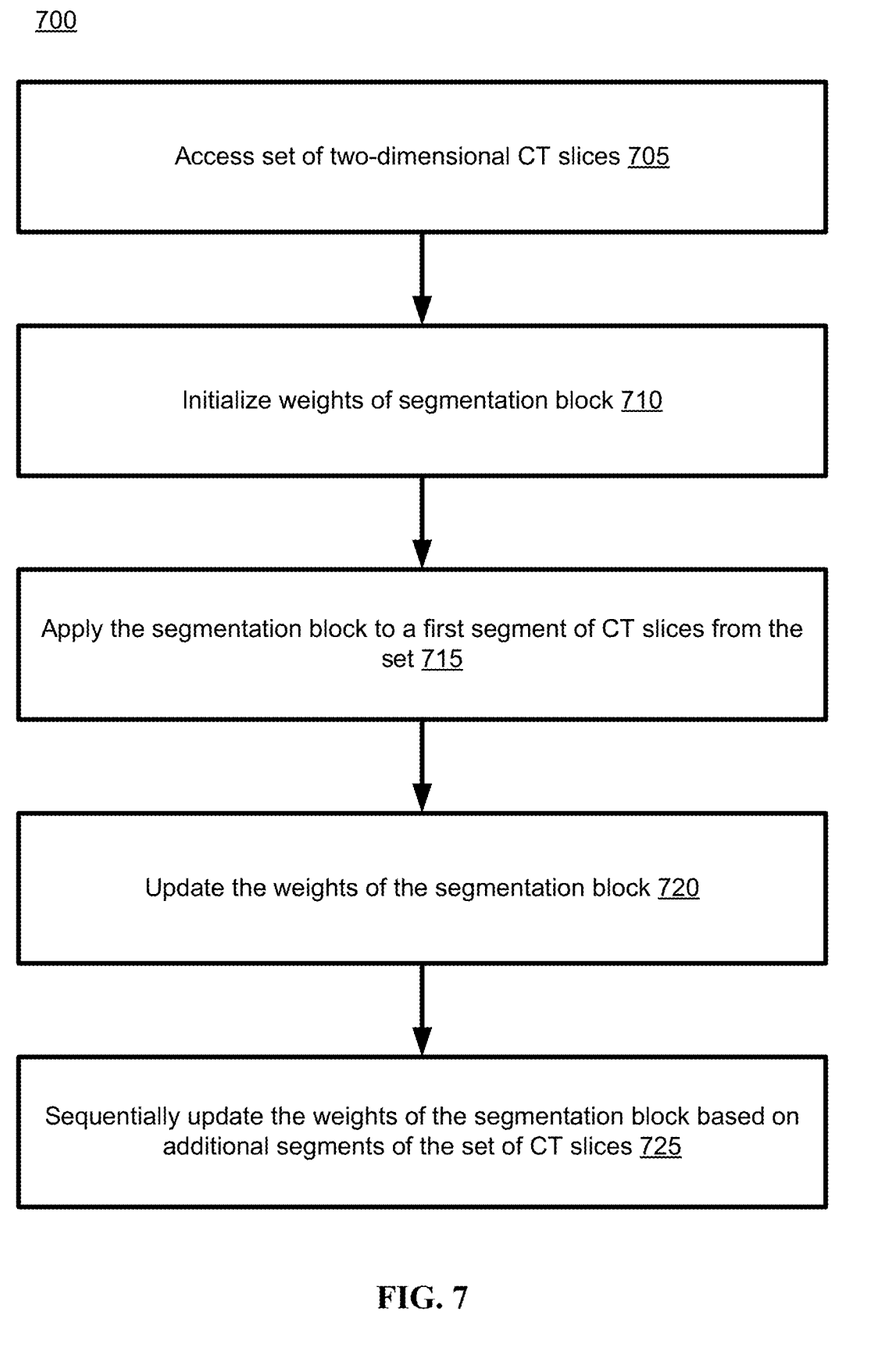
FIG. 7 is a flowchart of a method of training the segmentation block, according to one embodiment.

FIG. 7 is a flowchart of a method 700 of training the segmentation block 215, according to one embodiment. In the method 700 shown, a set of two-dimensional CT slices of lesions is accessed 705. The set includes a first segment of CT slices and a plurality of sequential segments of CT slices. Each CT slice in the first segment represents a first layer of a lesion and includes a single diameter measurement (e.g., center slices). Each slice in sequential segment represent a sequential layer of a corresponding lesion (e.g., edge slices). The weights of the segmentation block 215 are initialized 710 with initial values. The segmentation block 215 is applied 715 to the first segment of CT slices to generate a prediction of a segmentation of each CT slice in the first segment. The weights of the segmentation block 215 are updated 720 based on the prediction and the single diameter measurement of each CT slice in the first segment. The weights of the segmentation block 215 are sequentially updated 725 based on each additional segment for the plurality of sequential segments.

The weights of the segmentation block 215 are sequentially updated 725 by applying the segmentation block 215 to the additional segment to generate a prediction of a segmentation for each CT slice in the additional segment, refining the prediction of the segmentations to produce a refined segmentation of each CT slice in the additional segment, updating the weights of the segmentation block 215 based on the refined segmentations and the CT slices in the additional segment, and adding the CT slices in the additional segment to a sequential segment. In some embodiments, the segmentations are refined by applying the predictions and each CT slice in the additional segment to a fully-connected conditional random field.

Figure 8:
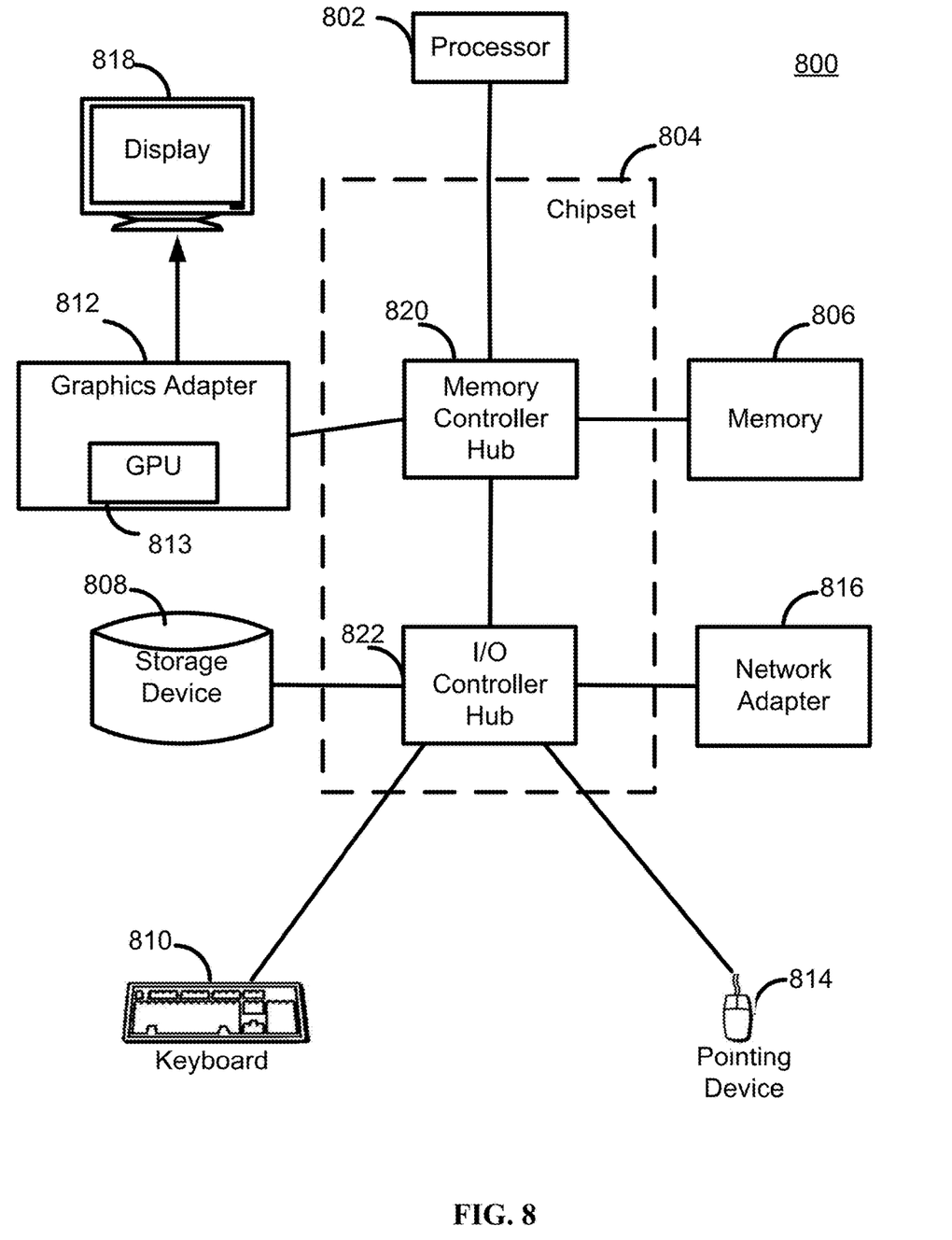
FIG. 8 is a high-level block diagram illustrating the computer logic components of an image segmentation system, according to one embodiment.

FIG. 8 is a high-level block diagram illustrating an example computer 800 suitable for implementing the entity of FIG. 1. The example computer 800 includes at least one processor 802 coupled to a chipset 804. The chipset 804 includes a memory controller hub 820 and an input/output (I/O) controller hub 822. A memory 806 and a graphics adapter 812, which contains a graphics processing unit (GPU) 813, are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touch-screen, or other type of pointing device, and is used in combination with the keyboard 810 (which may be an on-screen keyboard) to input data into the computer 800. The graphics adapter 812 displays images and other information on the display 818. The network adapter 816 couples the computer 800 to one or more computer networks.

The GPU 813 in the graphics adapter 812 may be used for other high-performance computation as well as processing graphical data for presentation on the display 818. In one embodiment, the GPU 813 is used to process data from the image segmentation system 125, where it is used to accelerate model training, image processing, and image segmentation.

The types of computers used by the entities of FIG. 8 can vary depending upon the embodiment and the processing power required by the entity. For example, the image segmentation system 125 might include a desktop computer to provide the functionality described. Furthermore, the computers can lack some of the components described above, such as keyboards 810, graphics adapters 812, and displays 818.

What is claimed is:

1. A computer-implemented method of segmenting a set of two-dimensional computed tomography (CT) slices corresponding to a lesion, comprising:
for each of at least a subset of the set of CT slices:
inputting the CT slice into a plurality of branches of a trained segmentation block, wherein each branch includes a convolutional neural network (CNN) with convolutional filters at a different scale, and each branch produces one or more levels of output;
generating feature maps for each of the levels of outputs, the feature maps generated by combining same-level outputs across each of the branches; and
generating a segmentation of the CT slice based on the feature maps;
aggregating the segmentations of each slice in the subset of CT slices to generate a three-dimensional segmentation of the lesion; and
transmitting data representing the three-dimensional segmentation of the lesion to a user interface for display of the three-dimensional segmentation,
wherein the segmentation block was trained by a process comprising:
accessing a set of two-dimensional CT slices of lesions, the set of two-dimensional CT slices including a first segment of CT slices, each CT slice in the first segment representing a first layer of a lesion and including a single diameter measurement, and a plurality of sequential segments of CT slices, each CT slice in a sequential segment representing a sequential layer of a corresponding lesion;
initializing weights of the segmentation block with initial values;
applying the segmentation block to the first segment of CT slices to generate a prediction of a segmentation for each CT slice in the first segment;
updating the weights of the segmentation block based on the prediction and the single diameter measurement of each CT slice in the first segment; and
sequentially updating the weights of the segmentation block based on each additional segment of the plurality of sequential segments by:
applying the segmentation block to the additional segment to generate a prediction of a segmentation for each CT slice in the additional segment;
refining the prediction of the segmentations to produce a refined segmentation of each CT slice in the additional segment;
updating the weights of the segmentation block based on the refined segmentations and the CT slices in the additional segment; and
adding the CT slices in the additional segment to a sequential segment.

2. The method of claim 1, wherein refining the prediction of the segmentations comprises: applying the predictions and each CT slice in the additional segment to a fully-connected conditional random field.

3. The method of claim 1, wherein each two-dimensional CT slice of the subset includes an object of interest, wherein a top level of the one or more levels of output is supervised by a segmentation mask of the object, and wherein a bottom level of the one or more levels of output is supervised by a boundary mask of the object.

4. The method of claim 1, wherein the segmentation block includes three branches.

5. The method of claim 1, wherein each branch produces three levels of output.

6. The method of claim 1, wherein a first branch of the one or more branches is a primary branch, wherein each additional branch adopts convolution filters based on the corresponding filters of the primary branch, and wherein the filter weights of the each of the branches are tied to the primary branch.

7. The method of claim 1, wherein the same-level outputs are combined using element-wise max-pooling.

8. The method of claim 1, wherein the segmentation block is optimized according to a joint loss function that is defined by $$\mathcal{L} = \omega_m \sum_{n \in l_1 l_2 l_3 l_{com}} \left(1 - \frac{2|M_n \cap \hat{M}_n|}{|M_n| + |\hat{M}_n|}\right) + \omega_b \sum_{n \in l_1 l_2 l_3 l_{com}} \left(1 - \frac{2|B_n \cap \hat{B}_n|}{|B_n| + |\hat{B}_n|}\right) + \omega_f \sum_{n \in l_1 l_2 l_3 l_{com}} \left(1 - \frac{2|L \cap \hat{L}|}{|L| + |\hat{L}|}\right),$$

wherein $\hat{M}_n$ is a regional prediction, $M_n$ is a regional ground-truth, $\hat{B}_n$ is a boundary prediction, $B_n$ is a boundary ground-truth, $\hat{L}$ is a final prediction, $L$ is a final ground truth, $\omega_m$, $\omega_b$, and $\omega_f$ are weights determining a respective contribution of a respective type of loss in the joint loss function, $l_1$ is a first level of output, $l_2$ is a second level of output, $l_3$ is a third level of output, $l_{com}$ is a combination of the first level of output, second level of output, and third level of output.

9. A non-transitory computer-readable storage medium containing computer program code comprising instructions for segmenting a set of two-dimensional computed tomography (CT) slices corresponding to a lesion that, when executed by a processor, causes the processor to:
for each of at least a subset of the set of CT slices:

input the CT slice into a plurality of branches of a trained segmentation block, wherein each branch includes a convolutional neural network (CNN) with convolutional filters at a different scale, and each branch produces one or more levels of output;
generate feature maps for each of the levels of outputs, the feature maps generated based on a concatenation of same-level outputs across each of the branches; and
generate a segmentation of the CT slice based on the feature maps of each of the levels of output;
aggregate the segmentations of each slice in the subset of CT slices to generate a three-dimensional segmentation of the lesion; and
transmit data representing the three-dimensional segmentation of the lesion to a user interface for display of the three-dimensional segmentation,
wherein the segmentation block was trained by a process comprising:
 accessing a set of two-dimensional CT slices of lesions, the set of two-dimensional CT slices including a first segment of CT slices, each CT slice in the first segment representing a first layer of a lesion and including a single diameter measurement, and a plurality of sequential segments of CT slices, each CT slice in a sequential segment representing a sequential layer of a corresponding lesion;
 initializing weights of the segmentation block with initial values;
 applying the segmentation block to the first segment of CT slices to generate a prediction of a segmentation for each CT slice in the first segment;
 updating the weights of the segmentation block based on the prediction and the single diameter measurement of each CT slice in the first segment; and
 sequentially updating the weights of the segmentation block based on each additional segment of the plurality of sequential segments by:
  applying the segmentation block to the additional segment to generate a prediction of a segmentation for each CT slice in the additional segment;
  refining the prediction of the segmentations to produce a refined segmentation of each CT slice in the additional segment;
  updating the weights of the segmentation block based on the refined segmentations and the CT slices in the additional segment; and
  adding the CT slices in the additional segment to a sequential segment.

10. The non-transitory computer-readable storage medium of claim 9, wherein refining the prediction of the segmentations comprises: applying the predictions and each CT slice in the additional segment to a fully-connected conditional random field.

11. The non-transitory computer-readable storage medium of claim 9, wherein each two-dimensional CT slice of the subset includes an object of interest, wherein a top level of the one or more levels of output is supervised by a segmentation mask of the object, and wherein a bottom level of the one or more levels of output is supervised by a boundary mask of the object.

12. The non-transitory computer-readable storage medium of claim 9, wherein the segmentation block includes three branches.

13. The non-transitory computer-readable storage medium of claim 9, wherein a first branch of the one or more branches is a primary branch, wherein each additional branch adopts convolution filters based on the corresponding filters of the primary branch, and wherein the filter weights of the each of the branches are tied to the primary branch.

14. The non-transitory computer-readable storage medium of claim 9, wherein the segmentation block is optimized according to a joint loss function that is defined by:

$$\mathcal{L} = \omega_m \sum_{n \in l_1 l_2 l_3 l_{com}} \left(1 - \frac{2|M_n \cap \hat{M}_n|}{|M_n| + |\hat{M}_n|}\right) + \omega_b \sum_{n \in l_1 l_2 l_3 l_{com}} \left(1 - \frac{2|B_n \cap \hat{B}_n|}{|B_n| + |\hat{B}_n|}\right) \omega_f + \sum_{n \in l_1 l_2 l_3 l_{com}} \left(1 - \frac{2|L \cap \hat{L}|}{|L| + |\hat{L}|}\right),$$

wherein $\hat{M}_n$ is a regional prediction, $M_n$ is a regional ground-truth, $\hat{B}_n$ is a boundary prediction, $B_n$ is a boundary ground-truth, $\hat{L}$ is a final prediction, L is a final ground truth, $\omega_m$, $\omega_b$, and $\omega_f$ are weights determining a respective contribution of a respective type of loss in the joint loss function, $l_1$ is a first level of output, $l_2$ is a second level of output, $l_3$ is a third level of output, $l_{com}$ is a combination of the first level of output, second level of output, and third level of output.

15. A computer-implemented method of segmenting a set of two-dimensional computed tomography (CT) slices corresponding to a lesion, comprising:
for each of at least a subset of the set of CT slices:
 inputting the CT slice into a plurality of branches of a trained segmentation block, wherein each branch includes a convolutional neural network (CNN) with convolutional filters at a different scale, and each branch produces one or more levels of output;
 generating feature maps for each of the levels of outputs, the feature maps generated by combining same-level outputs across each of the branches; and
 generating a segmentation of the CT slice based on the feature maps;
aggregating the segmentations of each slice in the subset of CT slices to generate a three-dimensional segmentation of the lesion; and
transmitting data representing the three-dimensional segmentation of the lesion to a user interface for display of the three-dimensional segmentation,
wherein the segmentation block is optimized according to a joint loss function that is defined by:

$$\mathcal{L} = \omega_m \sum_{n \in l_1 l_2 l_3 l_{com}} \left(1 - \frac{2|M_n \cap \hat{M}_n|}{|M_n| + |\hat{M}_n|}\right) + \omega_b \sum_{n \in l_1 l_2 l_3 l_{com}} \left(1 - \frac{2|B_n \cap \hat{B}_n|}{|B_n| + |\hat{B}_n|}\right) \omega_f + \sum_{n \in l_1 l_2 l_3 l_{com}} \left(1 - \frac{2|L \cap \hat{L}|}{|L| + |\hat{L}|}\right),$$

wherein $\hat{M}_n$ is a regional prediction, $M_n$ is a regional ground-truth, $\hat{B}_n$ is a boundary prediction, $B_n$ is a boundary ground-truth, $\hat{L}$ is a final prediction, L is a final ground truth, $\omega_m$, $\omega_b$, and $\omega_f$ are weights determining a respective contribution of a respective type of loss in the joint loss function, $l_1$ is a first level of output, $l_2$ is a second level of output, $l_3$ is a third level of output, $l_{com}$ is a combination of the first level of output, second level of output, and third level of output.

16. The method of claim 15, wherein refining the prediction of the segmentations comprises: applying the predictions and each CT slice in the additional segment to a fully-connected conditional random field.

17. The method of claim 15, wherein each two-dimensional CT slice of the subset includes an object of interest, wherein a top level of the one or more levels of output is supervised by a segmentation mask of the object, and wherein a bottom level of the one or more levels of output is supervised by a boundary mask of the object.

18. The method of claim 15, wherein the segmentation block includes three branches.

19. The method of claim 15, wherein each branch produces three levels of output.

20. The method of claim 15, wherein a first branch of the one or more branches is a primary branch, wherein each additional branch adopts convolution filters based on the corresponding filters of the primary branch, and wherein the filter weights of the each of the branches are tied to the primary branch.

\* \* \* \* \*

UNITED STATES PATENT AND TRADEMARK OFFICE
CERTIFICATE OF CORRECTION

PATENT NO. : 11,232,572 B2
APPLICATION NO. : 16/848192
DATED : January 25, 2022
INVENTOR(S) : Chen et al.

It is certified that error appears in the above-identified patent and that said Letters Patent is hereby corrected as shown below:

In the Claims

In Column 14, in Claim 8, Line 42, delete "by" and insert -- by: --, therefor.

In Column 16, in Claim 14, Lines 14-16, delete "$\left(1-\frac{2|B_n \cap \hat{B}_n|}{|B_n|+|\hat{B}_n|}\right)\omega_f +$" and insert -- $\left(1-\frac{2|B_n \cap \hat{B}_n|}{|B_n|+|\hat{B}_n|}\right)+\omega_f$ --, therefor.

In Column 16, in Claim 15, Lines 57-58, delete "$\left(1-\frac{2|B_n \cap \hat{B}_n|}{|B_n|+|\hat{B}_n|}\right)\omega_f +$" and insert -- $\left(1-\frac{2|B_n \cap \hat{B}_n|}{|B_n|+|\hat{B}_n|}\right)+\omega_f$ --, therefor.

Signed and Sealed this
Nineteenth Day of July, 2022

Katherine Kelly Vidal
*Director of the United States Patent and Trademark Office*